Figure 3:
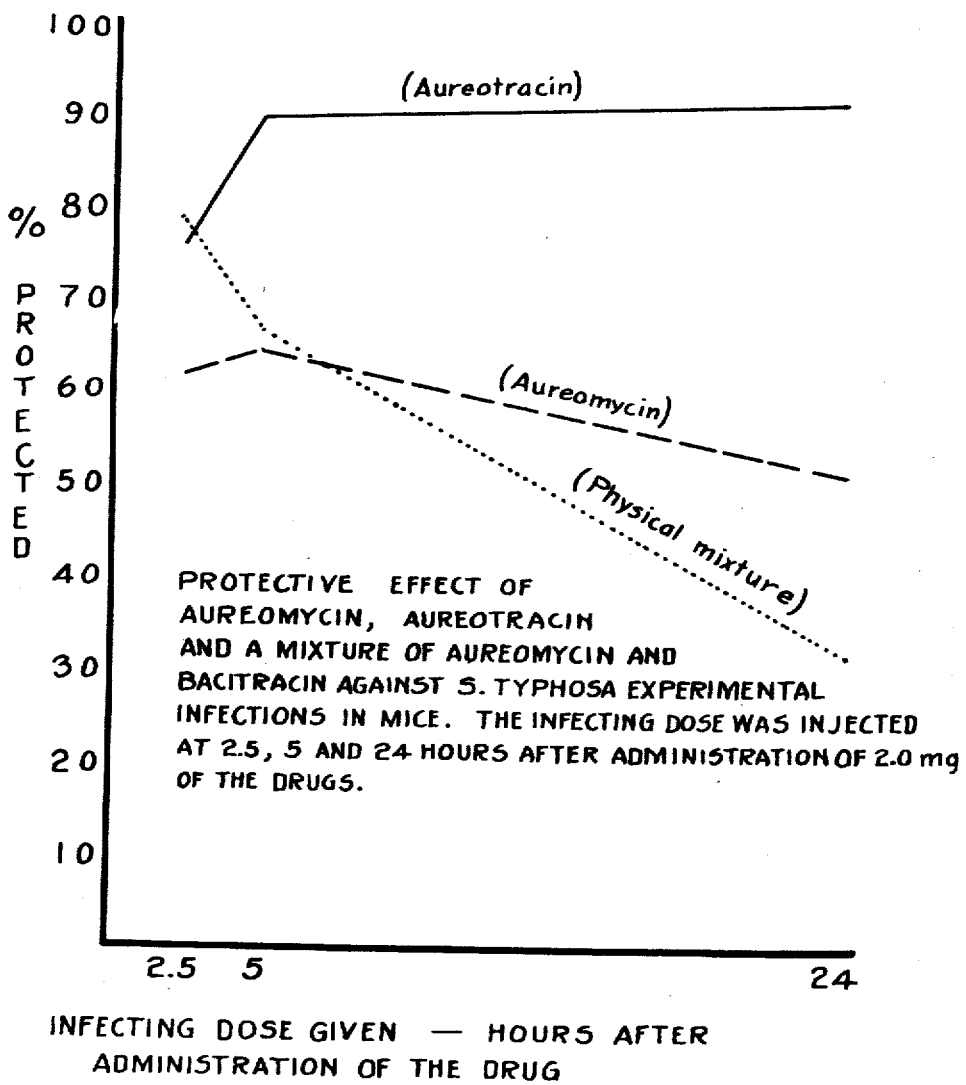

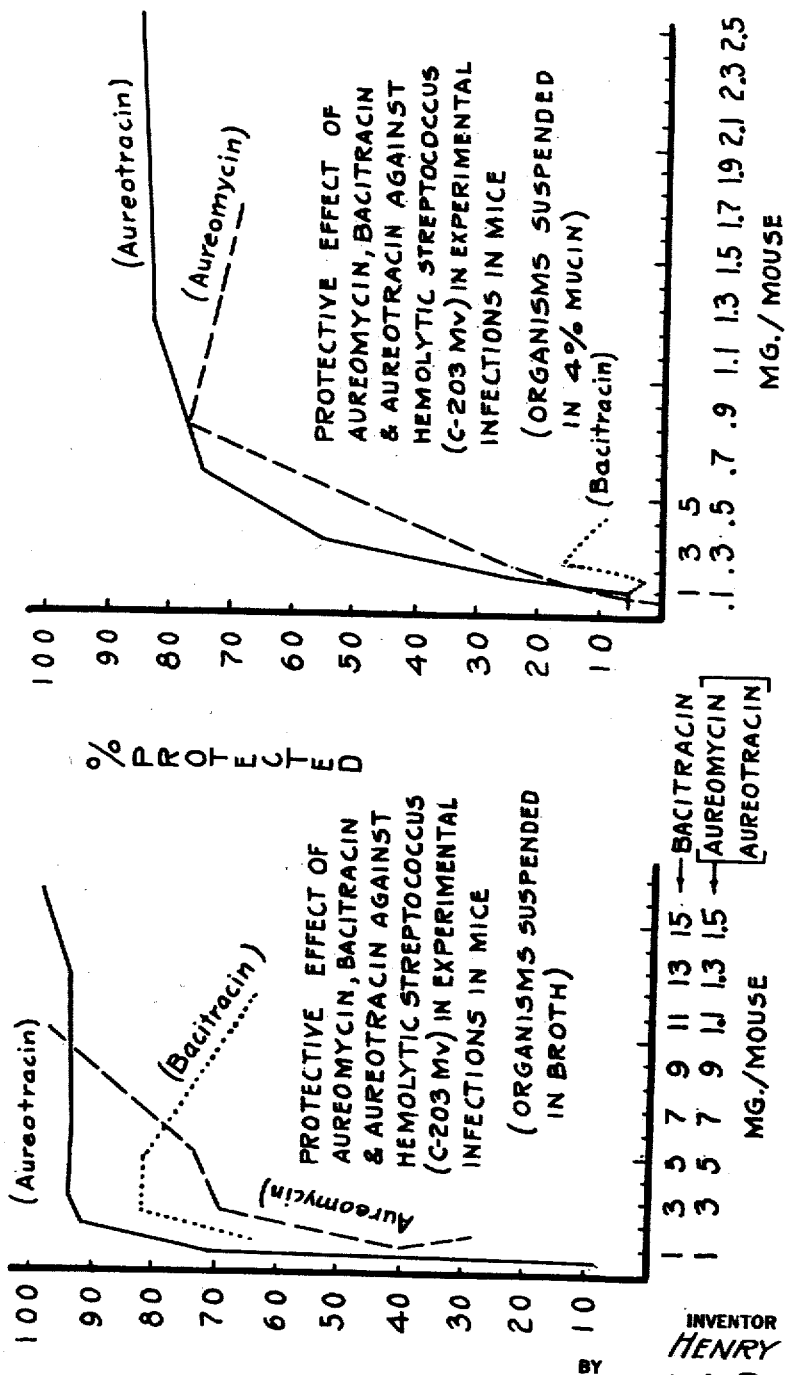

Patented Oct. 30, 1951

2,572,897

UNITED STATES PATENT OFFICE 2,572,897

PROCESS OF PRODUCTION OF AUREO-
TRACIN, A COMPOUND OF AUREO-
MYCIN AND BACITRACIN

Henry Welch, Silver Spring, Md., assignor to the
United States of America

Application June 13, 1949, Serial No. 98,870

1 Claim. (Cl. 167—65)

(Granted under the act of March 3, 1883, as
amended April 30, 1928; 370 O. G. 757)

My invention relates to a therapeutic composition having reduced toxicity, and more particularly to a therapeutic compound of aureomycin and bacitracin which has a toxicity materially lower than that of the antibiotic agents utilized in its preparation.

Aureomycin, a new drug produced in broth media under controlled conditions by the organism Streptomyces aureofacians, is highly efficacious when administered orally, but up to the present time intramuscular injection of this drug has been accompanied by intense pain. Reports of treatment schedules employing intravenous administration have appeared but the danger of thrombi of the vein is ever present and this danger has mitigated against this mode of administration. Various solvents have been used in an attempt to reduce or minimize the pain following intramuscular injection but none have been particularly successful in reducing the incidence of pain on injection. Attempts were made in this laboratory to coat the crystals of aureomycin with pectin in much the same way that potassium penicillin is coated (described in patent application 79,264 filed March 4, 1949), but the failure to find suitable solvents for the coating or co-precipitation procedures made this impossible.

Bacitracin, a second new drug produced in broth media under controlled conditions by the organism Bacillus subtilis, does not lend itself to parenteral administration. Through some as yet unknown physiological process, the excretion of injected bacitracin results in damage to the tubules of the kidneys, this damage ranging from slight, as evidenced by albuminuria, to complete destruction of the kidney function and death, depending upon the dose. Oral and topical administration of bacitracin are used in therapy but severe limits are imposed, since systemic infections in which the drug might be of value cannot be treated because of the toxicity.

The object of this invention, therefore, is to provide a method for obtaining a substance of improved pharmacological properties from two drugs, aureomycin and bacitracin, the former of which is highly irritating on injection while the latter on injection may cause serious kidney damage.

By reacting aureomycin with bacitracin I have discovered that the reaction product hereafter called "Aureotracin" has markedly decreased toxic properties. In addition, aureotracin is a highly insoluble compound which is of distinct advantage in that following injection into the body it is slowly absorbed, thus giving a prolonged therapeutic effect, whereas both aureomycin and bacitracin being readily soluble in water are quickly absorbed by the water of the tissues and are rather rapidly eliminated from the body. Of importance also is the fact that aureotracin has an increased therapeutic effect against a sensitive organism, such as the hemolytic streptococcus, over that produced by comparable doses of aureomycin or bacitracin whether the latter two drugs are injected individually into the animal body or in mixtures. The decrease in toxicity, insolubility in water and increased therapeutic efficacy make aureotracin of considerably greater potential usefulness in medicine than aureomycin or bacitracin per se.

The exact chemical structures of both bacitracin and aureomycin are unknown. Both are rather complex metabolic products of microbial growth. The available data indicate that bacitracin is a polypeptide of relatively large molecular size and one containing numerous amino acid residues in its makeup, while aureomycin appears to be an organic compound of relatively low molecular weight containing a non-ionic chlorine radical.

When aureomycin is suspended in a neutral oil and observed under the microscope a definite crystalline structure appears. When aureomycin and bacitracin are suspended in oil in a physical mixture and observed under the same conditions, the bacitracin appears as an amorphous powder while the aureomycin crystals retain their individual identity and may be definitely identified. When the compound aureotracin formed in the manner to be described is observed under similar conditions, it appears as a completely amorphous substance in which none of the crystals of free aureomycin are present. Dissolution of the compound by strong acids or alkalis results in a recovery of approximately 50% by weight of aureomycin and approximately 50% by weight of bacitracin, indicating that the two substances combine to form a new compound on a weight-for-weight basis. The reaction product produced by the process herein described appears to be specific for aureomycin and bacitracin, since attempts to produce a reaction product under a variety of conditions with the polypeptides, tyrocidin, gramicidin, subtilin, proteose-peptones, and various amino acids with aureomycin were unsuccessful.

The following example will illustrate the method of preparation of aureotracin.

Example 1

Ninety grams of bacitracin was dissolved in 900 ml. of 95% ethanol and 10 grams of crystalline aureomycin hydrochloride was dissolved separately in 600 ml. of 70% ethanol and the two solutions mixed. A reaction occurs almost immediately between the two drugs and a precipitate forms. After a few minutes the reaction mixture was placed in the refrigerator and allowed to cool to approximately 8°–14° C. The reaction mixture was then placed in a Dry Ice deep freeze at a temperature of approximately minus 70° C. until no further precipitation occurred. The precipitate was then collected by centrifugation and decantation of the supernatant ethanol and then washed three times with fresh cold 95% ethanol. In a similar manner the precipitate was washed separately three times with distilled water and three times with n-butyl alcohol. After the third and final washing with n-butyl alcohol the precipitate was dried to less than 1% volatile matter by freeze-drying under reduced pressure.

The mode of treatment of aureomycin with bacitracin can be varied and yet the compound aureotracin formed appears to have substantially the same physical properties, pharmacolgical and therapeutic activity. For example, aureomycin and bacitracin can be mixed in aqueous solutions rather than in ethanol solutions and aureotracin formed. The yield, however, is not as great. Similarly, lower yields of aureotracin are produced at room temperature than at lower temperatures. In addition, washing with ethanol and n-butyl alcohol are not essential to the production of aureotracin, although the use of these reagents improves the purity of the final product. Furthermore, amorphous aureomycin hydrochloride may be used in the process without difficulty. As a matter of fact, amorphous aureomycin hydrochloride is more readily soluble in ethanol and water than is crystalline aureomycin, and because of this I have found it desirable to acidify slightly the 70% ethanol solution to facilitate solubilization of crystalline aureomycin hydrochloride.

Aureotracin produced by the above-described process is a light yellow amorphous powder having a solubility of approximately 0.02% in water. It is relatively insoluble in organic solvents such as ethanol and n-butyl alcohol.

The following example will illustrate the method of determining the optimal proportions of aureomycin and bacitracin to produce the maximum yield of aureotracin. In the first experiment the bacitracin solutions were held at a constant concentration and the aureomycin solutions varied in their concentrations. The results were as follows:

Example 2

| Bacitracin, Solutions per 2 ml. | Aureomycin, Solutions per 2 ml. | Ratio Bacitracin to Aureomycin | Aureotracin Precipitate |
|---|---|---|---|
| Mg. 100 | Mg. 0.16 | 600:1 | Very Slight. |
| 100 | 0.32 | 300:1 | 1 Plus. |
| 100 | 0.62 | 150:1 | 2 Plus. |
| 100 | 1.25 | 75:1 | 3 Plus. |
| 100 | 2.5 | 40:1 | Heavy. |
| 100 | 5.0 | 20:1 | Very Heavy. |
| 100 | 10.0 | 10:1 | Do. |
| 100 | 20.0 | 5:1 | Do. |
| 100 | 50.0 | 2:1 | Do. |

As will be seen from the above table, the yield from the 20:1 combination was just as great as that from the 2:1 combination. This indicates that a decrease in the ratio of bacitracin to aureomycin from 20:1 to 2:1 did not increase the yield. In the second experiment the aureomycin solutions were held at a constant concentration and the bacitracin solutions varied in concentration.

Example 3

| Aureomycin, Solutions per 2 ml. | Bacitracin, Solutions per 2 ml. | Ratio | Aureotracin Precipitate |
|---|---|---|---|
| Mg. 10 | 12.5 | 1:1.25 | Very Slight. |
| 10 | 25 | 1:2.5 | 2 Plus. |
| 10 | 50 | 1:5 | 3 Plus. |
| 10 | 100 | 1:10 | Heavy. |
| 10 | 200 | 1:20 | Very Heavy. |
| 10 | 300 | 1:30 | Do. |
| 10 | 400 | 1:40 | Do. |

It appears therefore from the above table that the optimum relative concentrations in the reaction mixture of aureomycin to bacitracin should be 1:20. The preceding two experiments were conducted using water as the solvent. Since organic solvents in the reacting mixture would allow smaller volumes for putting the aureomycin in solution and would facilitate final drying, the above two experiments were repeated using 95% ethanol as the solvent. The results, insofar as the relative combining proportions are concerned, were the same but the yield was considerably greater.

The reduced toxicity of aureotracin as compared to the toxicity of a simple mixture of bacitracin and aureomycin is illustrated in the following example.

Example 4

TOXICITY OF A MIXTURE OF BACITRACIN AND AUREOMYCIN VS. AUREOTRACIN COMPOUND

| Dosage [1] per 20 Gm. Mouse | Mixture of Aureomycin and Bacitracin | | Compound Aureotracin | |
|---|---|---|---|---|
| | No. of Mice Injected | No. of Mice Dead | No. of Mice Injected | No. of Mice Dead |
| 5 | 10 | 2 | 10 | 0 |
| 10 | 10 | 10 | 10 | 0 |
| 20 | 10 | 10 | 10 | 0 |
| 40 | 10 | 10 | 10 | 0 |

[1] All injections intraperitoneal. Results determined after 96 hours. Both mixture and compound were suspended in sesame oil.

In the experiments illustrated in the above table, mice of 20 grams weight were utilized in all instances, and these were injected with from 5 to 40 mg. each with aureotracin, and for comparison similar amounts were injected of a mixture of aureomycin and bacitracin, such mixture having approximately the same proportions of aureomycin and bacitracin utilized in preparing the aureotracin compound. It is apparent from the results tabulated above that the toxicity of aureotracin is markedly lower than the toxicity of a mixture of aureomycin and bacitracin when the latter drugs are mixed in the same proportions as those utilized for the preparation of the compound aureotracin. Of the 10 mice injected with the mixture, 2 were dead within 96 hours, while with higher doses of this mixture, i. e., 10, 20, and 40 mg., all mice died within the 96-hour period. By comparison, none of the individual groups of 10 mice, each injected with from 5 to 40 mg. of aureotracin, succumbed to the injection within a period of 96 hours. In these experiments, both the mixture of aureomycin and bacitracin and the compound of aureotracin were suspended in sesame oil to facilitate injection.

Aureotracin has an increased protective effect against certain experimental infections in mice, and this may be demonstrated by treating mice infected with hemolytic streptococci with the three drugs (aureotracin, aureomycin, and bacitracin). For example, in the experiments illustrated in Figure 1, a group of 320 mice were infected with sufficient hemolytic streptococci to cause death. As rapidly as possible, groups of 40 of the total of 320 were injected with various concentrations of aureotracin. Similarly, 200 mice in groups of 40 were infected with the hemolytic streptococcus and then treated with various concentrations of aureomycin. In a similar manner 160 mice in groups of 40 were infected with hemolytic streptococcus and treated with various concentrations of bacitracin. Deaths of the injected mice were recorded on the third day. It is apparent from the curves shown in Figure 1 that aureotracin shows a higher degree of protection against hemolytic streptococcus infections in mice than either bacitracin or aureomycin, the ratio being approximately 3–1 in favor of aureotracin.

It has been known for some time that when cultures of pathogenic organisms are suspended in mucin instead of a broth, the virulence of the culture is markedly enhanced, and a more severe infection follows the injection of mucin-treated cultures. In order to subject aureotracin to a more rigid test, broth cultures of hemolytic streptococci (C-203MV) were diluted in 4% mucin instead of broth, and a group of 360 mice were infected with this suspension. Groups of 40 of these infected mice were immediately treated with various concentrations of aureotracin and the degree of protection determined during a three-day-period. In a similar manner, 240 infected mice were treated with various concentrations of aureomycin and 160 infected mice were treated with various concentrations of bacitracin, and the degree of protection determined for the latter two drugs after a period of three days. The results of these experiments are illustrated in Figure 2. It is apparent that the increased virulence of the hemolytic streptococcus was so great that the highest concentration of bacitracin employed, namely, 4.0 mg., failed to afford any significant protection. It will be noted also that with both aureotracin and aureomycin, the protective effect of these two drugs was reduced over that obtained under the conditions illustrated in Figure 1 where the infecting organism was not treated with mucin. However, it is again apparent from the curves shown in Figure 2 that aureotracin was many times more effective than bacitracin in protecting the mice from experimental infections with hemolytic streptococci, as well as being somewhat more effective than aureomycin.

Because of the high insolubility of aureotracin, the drug is absorbed but slowly from the tissues in the animal body. Its therapeutic effect, therefore, is markedly prolonged. Both aureomycin and bacitracin, however, are quite soluble in the body fluids, and are absorbed and eliminated relatively rapidly. In theory, therefore, it should be possible to inject aureotracin in experimental animals and infect them at a somewhat later period of time, and still produce protection for the animals from the experimental infection. The results obtained from experiments designed along these lines are illustrated in Figure 3. In these experiments 150 mice were injected intraperitoneally with 2 mg. of aureotracin each; a second group of 150 mice were injected each with 2 mg. of aureomycin; and, finally, a third group of 150 mice were injected with a mixture of bacitracin and aureomycin. To facilitate handling, all three drugs were suspended in sesame oil before injection. Two and one-half hours after the 150 mice in the aureotracin group had been injected, 50 of them were infected with *Salmonella typhosa* in broth cultures in sufficient concentrations to cause death. At the same time, 50 of the mice in the aureomycin group and 50 of the mice in the aureomycin-bacitracin-mixture group were similarly infected. In a similar manner, a second group of 50 mice each from the three groups were infected 5 hours after the drugs had been given, and finally 50 mice from each of the three groups were infected with *Salmonella typhosa* 24 hours after the three drugs had been given. It is apparent from Figure 3 that when the mice were infected two and one-half hours after the drug had been given, the physical mixture of aureomycin and bacitracin and aureotracin showed approximately the same degree of protection (75%–80%) whereas the aureomycin, when the infection is given at this time, gives from 60%–65% protection. However, when the infecting dose is given 5 hours after the drug, aureotracin protects 90% of the mice, while the protection afforded by aureomycin or the bacitracin-aureomycin-mixture is approximately 65%. The differences in protective effect of aureotracin vs. aureomycin and the bacitracin-aureomycin-mixture is very marked when the infecting dose is given 24 hours after the drug, since at this time aureotracin protects more than 90% of the mice so treated, while a protection of only 52% of the mice is effected with aureomycin and only 32% of the mice with the bacitracin-aureomycin-mixture. It is apparent, therefore, that aureotracin is capable of protecting greater numbers of mice for a longer period of time than is either aureomycin or a mixture of bacitracin and aureomycin in experimental infections of *S. typhosa* in mice.

The invention described herein may be manufactured and used by or for the Government of the United States for Government purposes without the payment to me of any royalty thereon in accordance with the provisions of the Act of April 30, 1928. (Ch. 460, 45 Stat. L. 467.)

Having thus described my invention, I claim:

A process for the preparation of aureotracin which comprises reacting in solution about one part of aureomycin with about twenty parts of bacitracin, and separating and recovering the formed precipitate.

HENRY WELCH.

REFERENCES CITED

The following references are of record in the file of this patent:

Am. J. Pharm., November 1948, pp. 430, 431, 437–439.

Proc. of the Staff Meetings of the Mayo Clinic, March 16, 1949, vol. 24, No. 6, pp. 136–139.

Physicians' Bulletin, August 1947, p. 120.

Certificate of Correction

Patent No. 2,572,897                            October 30, 1951

HENRY WELCH

It is hereby certified that error appears in the printed specification of the above numbered patent requiring correction as follows:

Column 1, line 29, for "Bacitracia" read *Bacitracin*; column 3, line 27, for "pharmacolgical" read *pharmacological*;

and that the said Letters Patent should be read as corrected above, so that the same may conform to the record of the case in the Patent Office.

Signed and sealed this 12th day of February, A. D. 1952.

[SEAL]

THOMAS F. MURPHY,
*Assistant Commissioner of Patents.*